Figure 1:
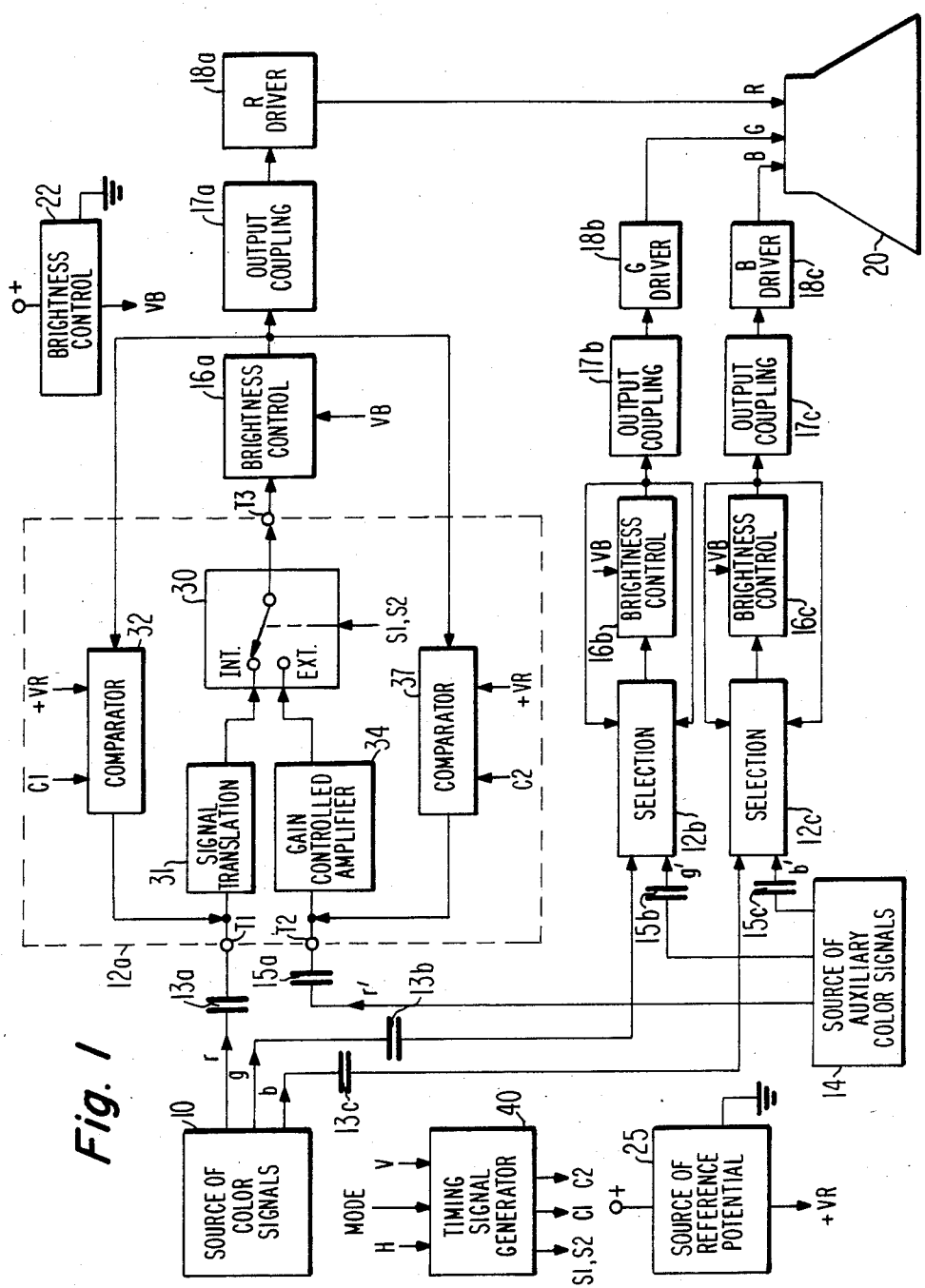

United States Patent [19]

Filliman et al.

[11] Patent Number: 4,660,084

[45] Date of Patent: Apr. 21, 1987

[54] TELEVISION RECEIVER WITH SELECTABLE VIDEO INPUT SIGNALS

[75] Inventors: Paul D. Filliman, Marion County, Ind.; Leopold A. Harwood, Somerset County, N.J.; Ronald T. Keen, Marion County; Robert P. Parker, Hamilton County, both of Ind.

[73] Assignee: RCA Corporation, Princeton, N.J.

[21] Appl. No.: 780,014

[22] Filed: Sep. 25, 1985

[51] Int. Cl.[4] .......................... H04N 5/16; H04N 5/18
[52] U.S. Cl. ..................................... 358/171; 358/168; 358/172
[58] Field of Search ............... 358/168, 171, 172, 174, 358/176, 178, 181

[56] References Cited

U.S. PATENT DOCUMENTS 4,301,474  11/1981  Jurgensen ........................... 358/171
4,414,572  11/1983  Flory ................................... 358/172

OTHER PUBLICATIONS

Technical specification pages for the Mitsubishi M51322P RGB Interface Integrated Circuit (Approved Jun. 1984).

Primary Examiner—Tommy P. Chin
Attorney, Agent, or Firm—P. J. Rasmussen; P. M. Emanuel; R. H. Kurdyla

[57] ABSTRACT

A television receiver is arranged to selectively display either information from a broadcast television signal or information from an auxiliary video signal, in accordance with the position of a switching network to which the signals are capacitively coupled via respective capacitors. Similar black reference levels are established for the television and auxiliary signals by means of respective clamping circuits, including the coupling capacitors, which operate at different times but with respect to the same clamping reference voltage.

8 Claims, 2 Drawing Figures

TELEVISION RECEIVER WITH SELECTABLE VIDEO INPUT SIGNALS

This invention concerns a television receiver capable of selectively displaying either video information derived from a received broadcast television signal, or video information derived from an auxiliary video signal. In particular, this invention concerns apparatus for establishing substantially the same black image representative reference level for both broadcast television signal image information and auxiliary video signal image information.

Many broadcast television signal receivers are capable of displaying auxiliary video information including alphanumeric character information such as Teletext information, and information which may be provided by a computer terminal. In another type of video information display format, scenes derived from broadcast television signal information are displayed on a major portion of the television display screen, while a smaller portion of the display screen simultaneously displays another scene derived from auxiliary video signal information.

In such systems it is desirable to maintain substantially the same image black reference level, i.e., a brightness reference level, for displayed video information derived from all video input sources so that disturbing changes in image brightness or color temperature are not perceived as between one video input source and another. For video information contained in a conventional television signal in accordance with NTSC standards in the United States for example, the brightness of a displayed image is related to a black reference level which occurs during a so-called "back porch" interval within each periodic horizontal blanking interval of the television signal.

In accordance with the present invention there is disclosed herein apparatus in a video signal processing and display system such as a television receiver for providing displayed images with substantially the same black reference level with respect to image information derived from a normal broadcast television signal or from an auxiliary video signal. In the disclosed apparatus a signal selection network selectively couples the output of one of two sources of video signals to an image display device via respective first and second signal paths. The first of the two signals is illustratively a normal broadcast television signal, and the second signal is an auxiliary video signal. In accordance with the principles of the invention, the black reference level of the video signal coupled via the first signal path is established by a control circuit responsive to a reference voltage. The black reference level of the video signal coupled via the second signal path is also established by a control circuit which also responds to the reference voltage.

In an illustrated embodiment of the invention, the first and second video signals are capacitively coupled to the selection networks via first and second capacitors, and the control circuits for the first and second signal paths are clamping circuits. The capacitive coupling eliminates the effect of cumulative DC errors from preceding DC coupled circuits, and also eliminates problems of incompatibility between the DC output levels of the video signal sources and the input DC requirements of circuits associated with the selection networks. Moreover, the coupling capacitors act as clamping capacitors in conjunction with the respective clamping circuits, whereby separate clamping capacitors are not needed.

Figure 2:
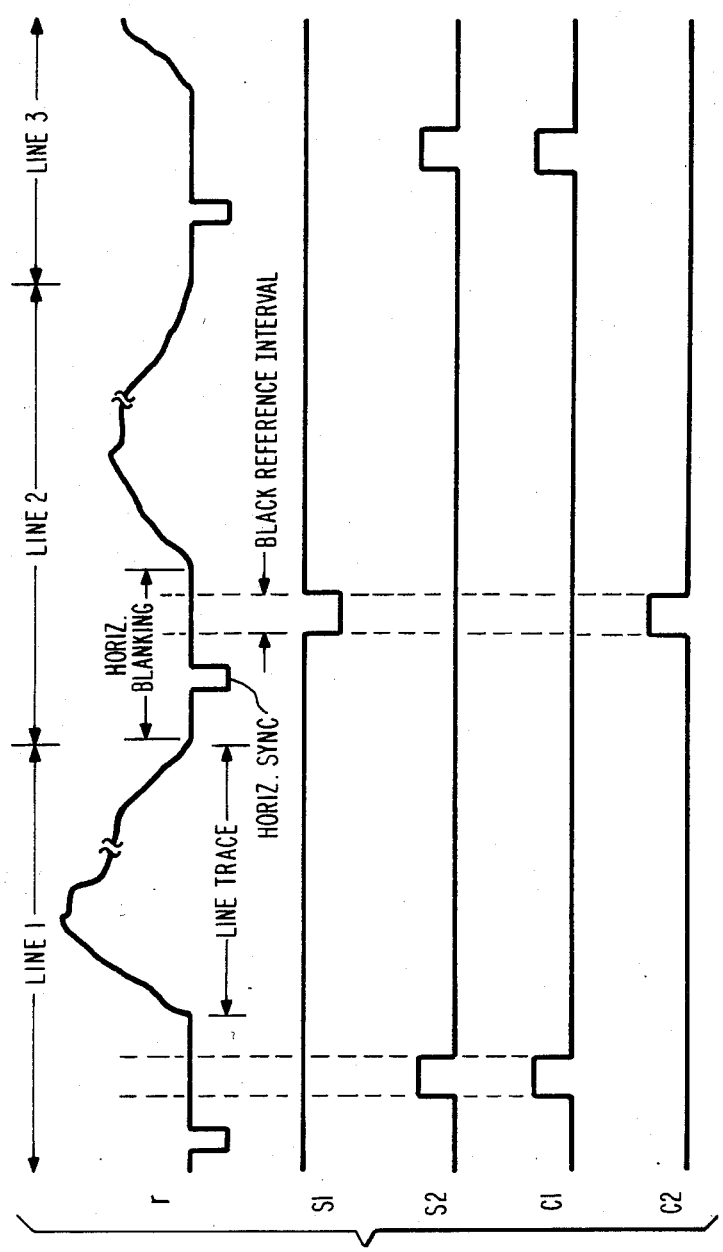

In the drawing:

FIG. 1 shows a portion of a color television receiver including a signal selection network according to the present invention including provision for establishing a black reference level for video signals selectively coupled thereby; and FIG. 2 illustrates waveforms helpful in understanding the operation of the selection networks in FIG. 1.

In FIG. 1, low level color image representative signals r, g and b from a source 10 are AC coupled via DC blocking capacitors 13a, 13b and 13c to respective first input terminals (e.g., T1) of red (R), green (G) and blue (B) video signal selection networks 12a, 12b and 12c. Auxiliary color image representative signals r', g' and b' from an auxiliary video signal source 14 are capacitively coupled via DC blocking capacitors 15a, 15b and 15c to respective second input terminals (e.g., T2) of selection networks 12a, 12b and 12c. Output signals from the selection networks are respectively coupled via brightness control networks 16a, 16b and 16c and output coupling networks 17a, 17b and 17c to red, green and blue display driver stages 18a, 18b and 18c which provide high level amplified color signals R, G and B to respective intensity control electrodes (e.g., cathode electrodes) of an image displaying kinescope 20.

Each of output coupling networks 17a, 17b and 17c illustratively includes a "zero offset" buffer circuit, which may be formed of cascaded NPN and PNP emitter follower stages, responsive to horizontal and vertical blanking signals developed by deflection circuits of the receiver for blanking signals at the input of the driver stage during horizontal and vertical image blanking intervals. Brightness control networks 16a, 16b and 16c contain similar level shifting circuits responsive to a variable DC control voltage VB from a viewer adjustable brightness control voltage source 22 for varying the DC level of video output signals from networks 12a–12c in accordance with the setting of the brightness control. Substantially identical image brightness levels are maintained for both the internal and the external signals since a common brightness control voltage VB is applied to similar brightness control networks 16a–16c respectively coupled to signal paths which convey both internal and external video signals. In this system the brightness control function is keyed such that brightness control voltage VB appears at the output of brightness control network 22 only during horizontal image trace intervals, and during retrace intervals brightness control source 22 provides an output reference voltage to networks 16a, 16b and 16c, i.e., in place of brightness control voltage VB, with the magnitude of such reference voltage corresponding approximately to the midrange value of brightness control voltage VB. For this purpose network 22 may include a keyed electronic switch which conveys brightness control voltage VB to the output of network 22 during image trace intervals, and conveys the reference voltage to the output of network 22 during retrace intervals.

Since selection networks 12a, 12b and 12c are identical in structure and operation, only the operation of selection network 12a will be described in detail.

Color signals r, g and b from source 10 are derived from a received broadcast television signal and are considered to be "internal" signals for the purpose of the following discussion. Auxiliary color signals r', g' and b' from source 14 are considered to be "external" signals. Both the internal and external signals include image synchronizing components which may be provided to synchronizing circuits of the receiver for synchronizing the horizontal and vertical scanning of a displayed image. The latter function can be accomplished by means of a video signal switching network such as the TA 7348P integrated circuit commercially available from Toshiba Corporation of Kawasaki, Japan. This switching network includes a manually or automatically activated electronic switch which selectively couples either detected video information (including synchronizing components) from a broadcast television signal to video and synchronizing signal processing circuits of the receiver in an internal signal display mode, or the synchronizing components of an external auxiliary video signal source to synchronizing signal processing circuits of the receiver in an external signal display mode.

A black reference DC voltage appears at the r, g and b color television signal outputs of source 10 during each so-called "back porch" interval of the television signal when a television signal modulated with image information is present. This interval includes a black reference interval, as shown in conjunction with the waveform for color signal r in FIG. 2 as will be discussed. A black reference voltage also appears during intervals including the back porch intervals when image information modulation is absent. A black reference level of each of the r, g and b signals is reliably established by a clamping circuit, e.g., a luminance signal clamping circuit associated with source 10, so that the respective black reference levels of signals from source 10 are substantially equal. Although the absolute value of such DC black reference levels is lost via capacitive coupling through capacitors 13a–13c, a desired absolute value of each black reference level is established by means of clamping circuits associated with selection networks 12a–12c as will be discussed. Source 10 does not include horizontal and vertical blanking circuits, which typically produce a blacker-than-black condition during image blanking intervals. Since the blanking level is not critical, it typically is not accurately established whereby the r, g and b signals may exhibit mutually different blanking levels. This effect can result in improper black reference voltages being developed by the clamping circuits associated with the selection networks. Accordingly, in the disclosed system blanking is accomplished via output coupling networks 17a, 17b and 17c as mentioned previously.

Selection network 12a includes an electronic switch 30 with an "internal" position (INT) and an "external" position (EXT), and responds to alternative control signals S1 and S2 as will be discussed in connection with FIG. 2. Output signals from switch 30 appear at output terminal T3.

Switch 30 occupies the INT position when "internal" r color signal information from source 10 is to be displayed. In such case the r signal is conveyed to kinescope 20 via a capacitively coupled video signal path including capacitor 13a, input terminal T1, a signal translating network 31 (e.g., including level shifting and buffer circuits), switch 30, brightness control 16a, coupling network 17a and driver 18a.

A first keyed differential comparator 32 responsive to a keying signal C1 operates during the black reference interval of alternate horizontal line blanking intervals, and compares the black reference voltage at the output of brightness control network 16a with a black reference voltage VR generated by a reference source 25. As a result of this comparison, a control current representative of the black reference voltage difference at the inputs of comparator 32 is developed at the output of comparator 32. The control current is applied to input coupling capacitor 13a to modify the charge on capacitor 13a, and thereby the DC condition of the internal video signal path, such that substantially equal black reference voltages appear at the inputs of comparator 32. Comparator 32 and input coupling capacitor 13a form a feedback clamp wherein by feedback control action a desired black reference voltage is established at output terminal T3, in the course of which the feedback control action compensates for any unwanted DC offsets associated with switch 30 and the circuits constituting signal translating network 31 and brightness control network 16a.

Switch 30 occupies the EXT position when external r' color signal information from source 14 is to be displayed. In such case signal r' is conveyed to kinescope 20 via a capacitively coupled signal path including DC blocking capacitor 15a, input terminal T2, a gain controlled amplifier 34, switch 30, brightness control 16a, coupling network 17a and driver 18a. Network 34 includes a variable gain amplifier responsive to a viewer adjustable contrast control (not shown) which is common to amplifier 34 and similar networks in selection networks 12b and 12c, for adjusting the peak-to-peak amplitude of signal r' independent of the contrast setting established for the internal signals from source 10. Amplifier 34 may also include level shifting and buffer circuits as in network 31.

A second keyed differential comparator 37 responsive to a keying signal C2 operates during the black reference interval of alternate horizontal line blanking intervals when first comparator 32 is inoperative (i.e., unkeyed), and compares the black reference voltage at the output of brightness control network 16a with black reference voltage VR from source 25. As a result of this comparison, a control current representative of the black reference voltage difference at the inputs of comparator 37 is developed at the output of comparator 37. This control current is applied to input coupling capacitor 15a to modify the charge thereof, and thereby modify the DC condition of the external video signal path such that substantially equal black reference voltages appear at the inputs of comparator 37. Comparator 37 and input coupling capacitor 15a also form a feedback clamp wherein by feedback control action a desired black reference voltage is established at output terminal T3, in the course of which the feedback control action compensates for any unwanted DC offsets associated with switch 30 and the circuits constituting gain controlled amplifier 34 and brightness control network 16a.

Additional details of the operation of network 12a are given below with regard to the waveforms for timing signals S1, S2, C1 and C2 shown in FIG. 2.

The first waveform shown in FIG. 2 depicts a portion (three horizontal line intervals) of red video signal r from source 10. The auxiliary video signal from source 14 exhibits the same format. Each horizontal line includes a negative-going horizontal synchronizing (sync) pulse interval, followed by a so-called back-porch black reference interval situated between the end of the horizontal sync pulse interval and the beginning of the horizontal line trace interval. The horizontal line blanking interval encompasses the horizontal sync and back porch intervals.

Switch 30 is placed in the upper, internal (INT) signal position whenever that one of alternative switching signals S1 or S2 which is coupled to switch 30 exhibits a positive level. Switch 30 is placed in the lower, external (EXT) position whenever that one of switching signals S1 or S2 which is coupled to switch 30 exhibits a less positive level.

Signal S1 exhibits a less positive level during the black reference intervals of even numbered horizontal lines. Therefore if signal S1 has been selected to be coupled to switch 30, switch 30 then occupies the EXT position. Signal S1 exhibits a more positive level during the reference intervals of odd numbered horizontal lines. Therefore if signal S1 has been selected to be coupled to switch 30, switch 30 then occupies the INT position. Signal S2 exhibits a less positive level during the reference intervals of even numbered horizontal lines. Therefore if signal S2 has been selected to be coupled to switch 30, switch 30 then occupies the EXT position. Signal S2 exhibits a more positive level during the reference intervals of odd numbered horizontal lines. Therefore if signal S2 has been selected to be coupled to switch 30, switch 30 then occupies the INT position.

Thus switch 30 alternates between the INT and EXT positions from one horizontal line black reference interval to the next for the purpose of black level control. The position of switch 30 during horizontal line trace intervals is determined by the sense (i.e., polarity) of switch control signals S1 and S2 during trace intervals. When a given horizontal line trace interval contains only internal signal information signal S1 controls the position of switch 30. When a given trace interval contains only external signal information signal S2 controls the position of switch 30.

However, during line trace intervals switch 30 can occupy either the INT or EXT position depending on the instructions received by switch 30 during the trace intervals. For example, assume that the receiver is in the "internal" display mode wherein switch 30 is controlled by signal S1, except that at certain times the receiver is intended to display auxiliary information, such as the time of day or the number of the channel to which the receiver is tuned, for example, on a small portion of the display screen either automatically or in response to an instruction from the viewer. Auxiliary display functions such as these are sometimes provided in conventional television receivers, which include a microprocessor controlled character generator responsive to control signals for enabling the display of the auxiliary information. Such control signals can be applied to the MODE control signal input of a timing signal generator 40 for temporarily causing the S2 signal to be applied to switch 30 when the auxiliary external information is to be displayed during a given portion of the horizontal trace interval of the internal video signal.

Comparator keying signal C1 exhibits positive keying pulse components during odd numbered horizontal black reference intervals, and comparator keying signal C2 exhibits positive keying pulse components occuring during even numbered horizontal black reference intervals. The timing of signals C1 and C2 remains the same for both internal and external display modes of the receiver.

Signals S1, S2, C1 and C2 are generated by timing signal generator 40 which responds to horizontal and vertical image synchronizing signals H and V developed by deflection synchronizing circuits of the receiver. Timing generator 40 also responds to a MODE control signal which determines which one of signal S1 and S2 is provided at a mode control output of generator 40. The MODE control signal may be developed either automatically by circuits within the receiver, or manually by a viewer when switching between an internal broadcast television image display mode and an external image display mode. For example, the display of (external) alphanumeric Teletext information on a portion of the display screen may proceed automatically by the MODE control signal enabling switch 30 to switch between the internal and external positions as required to display the Teletext information on a portion of the display screen which otherwise would display a broadcast television image. Alternatively, the Teletext information display can be enabled in response to the setting of a viewer controlled manual switch.

Each black reference interval encompassed by signals C1 and C2 corresponds to a "burst gate" interval as is known. Timing generator 40 includes a circuit for generating a burst gate pulse during each burst gate (black reference) interval. One type of burst gate pulse generator responsive to separated sync pulses is described in U.S. Pat. No. 4,051,518 - Sendelweck. The generated burst gate pulses are applied to suitable logic timing circuits such as including a flip-flop network for generating half line rate signals C1 and C2 from which signals S2 and S1 are respectively derived. Thus signals S1 and S2 are synchronized with respect to signals C2 and C1, which are synchronized by the burst gate pulses. Signals S1 and S2 may be generated continuously and applied to inputs of a logic circuit such as including a logic gate which also responds to the MODE control signal for determining which one of signals S1 and S2 is conveyed from the output of generator 40 to the control input of switch 30. Thus either signal S1 or signal S2 will be selectively conveyed from the output of generator 40 when the MODE control signal corresponds to either an internal or an external display mode, respectively.

With the dual image display capability of the disclosed receiver, it is desirable to maintain substantially the same black level for images displayed in both the internal and external modes. Otherwise, disturbing changes in image brightness and color temperature can result as between the display of internal broadcast television signal information and external signal information. The likelihood of such brightness changes occurring is substantially eliminated by disclosed selection networks 12a–12c with the associated clamping circuits which assist to automatically maintain substantially the same image black reference level for both internal and external image display modes.

In the internal display mode when broadcast television information provided by signal r from source 10 is to be displayed, timing generator 40 produces signal S1 at its mode control output. Signal S1 causes switch 30 to be placed in the INT position during the reference intervals of odd numbered horizontal lines, at which times comparator 32 is keyed to operate in response to signal C1. Thus the odd numbered horizontal reference intervals of the internal video signal are clamped to the desired black reference voltage by means of feedback control action as previously mentioned. The clamping voltage across capacitor 13a, which establishes the black reference voltage, is "held" until the next odd numbered line when comparator 32 is again keyed to operate.

In the external display mode when auxiliary information provided by signal r' from source 14 is to be displayed, timing generator 40 produces signal S2 at its mode control output. Signal S2 causes switch 30 to be placed in the EXT position during the reference intervals of even numbered horizontal lines, at which times comparator 37 is keyed to operate in response to signal C2. Thus the even numbered horizontal reference intervals of the external video signal are clamped to the desired black reference voltage by means of feedback control action as previously described. The clamping voltage across capacitor 15a, which establishes the black reference voltage, is "held" until the next even numbered line when comparator 37 is again keyed to operate.

The black reference voltages established for both the internal and external signals are advantageously substantially identical since such voltages are established by clamping action with respect to the same reference voltage +VR. The capacitive coupling of the internal and external signals to the selection network eliminates the effect of cumulative DC errors from preceding DC coupled circuits, and also eliminates problems of incompatibility between the DC output levels of the video signal sources and the input DC requirements of circuits associated with the selection networks. Moreover, the coupling capacitors advantageously act as clamping capacitors so that separate additional clamping capacitors are not needed, and additional external terminals are not needed to connect additional clamping capacitors to an integrated circuit device such as may contain selection networks 12a–12c.

What is claimed is:

1. A video signal processing system including an image display device, comprising:
    switching means having a first input for receiving a first video signal having image information occurring during periodic image intervals and a black reference component occurring during periodic blanking intervals, a second input for receiving an auxiliary second video signal having image information occurring during periodic image intervals and a black reference component occurring during periodic blanking intervals, a switching control input, and an output coupled to said display device;
    first means for capacitively coupling said first video signal to said first input of said switching means;
    second means for capacitively coupling said auxiliary second video signal to said second input of said switching means;
    timing means coupled to said switching control input of said switching means for causing said switching means to exhibit a first position for coupling said first input of said switching means to said display device via a first signal path in a first operating mode, and for causing said switching means to exhibit a second position for coupling said second input of said switching means to said display device via a second signal path in a second operating mode;
    means for providing a reference potential; and
    control means responsive to said reference potential and coupled to said first and second signal paths for automatically providing signals conveyed by said first and second paths with a desired black reference level.

2. A system according to claim 1, wherein said control means comprises:
    first control means responsive to said reference potential and coupled to said first signal path for providing signals conveyed by said first signal path with said desired black reference level; and
    second control means responsive to said reference potential and coupled to said second signal path for providing signals conveyed by said second signal path with said desired black reference level.

3. A system according to claim 2, wherein
    said first control means comprises a first keyed comparator with a signal input coupled to said first signal path at said output of said switching means, a signal input for receiving said reference potential, a control input, and an output coupled to said first capacitive coupling means;
    said second control means comprises a second keyed comparator with a signal input coupled to said second signal path at said output of said switching means, a signal input for receiving said reference potential, a control input, and an output coupled to said second capacitive coupling means; and
    said timing means is coupled to said control inputs of said first and second keyed comparators for enabling said first and second keyed comparators to operate during given video signal blanking intervals.

4. A system according to claim 3, wherein
    said first comparator is keyed to operate at times other than times when said second comparator is keyed to operate.

5. A system according to claim 1, wherein
    said video signal processing system is a broadcast television receiver; and
    said first video signal is derived from a broadcast television signal.

6. A system according to claim 1, wherein
    an image brightness control network is coupled between said output of said switching means and said display device.

7. A video signal processing and display system including an image display device comprising:
    switching means having a first input for receiving a first video signal having image information occurring during periodic image intervals and a black reference component occurring during periodic reference intervals, a second input for receiving an auxiliary second video signal having image information occuring during periodic image intervals and a black reference component occurring during periodic reference intervals, a switching control input, and an output coupled to said display device;
    timing means coupled to said switching control input of said switching means for causing said switching means to exhibit a first position for coupling said first input of said switching means to said display device via a first signal path in a first operating mode, and for causing said switching means to exhibit a second position for coupling said second input of said switching means to said display device via a second signal path in a second operating mode;
    means for providing a reference potential;
    first clamping means with an input coupled to said first signal path at said output of said switching means, an input for receiving said reference potential, and an output coupled to said first signal path at said first input of said switching means, said first clamping means being operative periodically during first given video signal reference intervals for clamping said first signal path to a desired black reference level during said first given video signal reference intervals; and second clamping means with an input coupled to said second signal path at said output of said switching means, an input for receiving said reference potential, and an output coupled to said second signal path at said second input of said switching means, said second clamping means being operative periodically during second given video signal reference intervals for clamping said second signal path to said desired black reference level during said second given video signal reference intervals.

8. Apparatus according to claim 7, wherein each of said clamping means comprises a keyed differential comparator arranged in a feedback control loop with said first and second video signal paths, respectively.

* * * * *